Aug. 26, 1947.    F. F. LINN    2,426,513
WHEEL SUSPENSION FOR VEHICLES
Filed Feb. 25, 1947    2 Sheets-Sheet 1
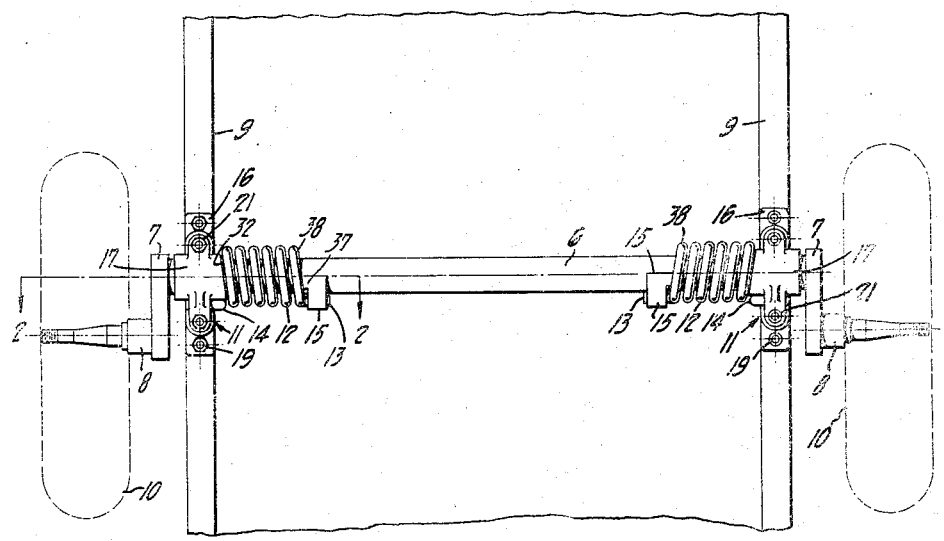
FIG_1_
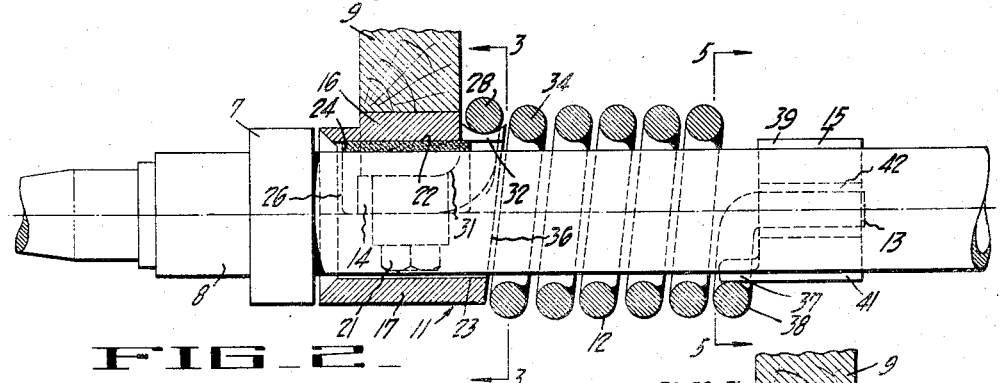
FIG_2_
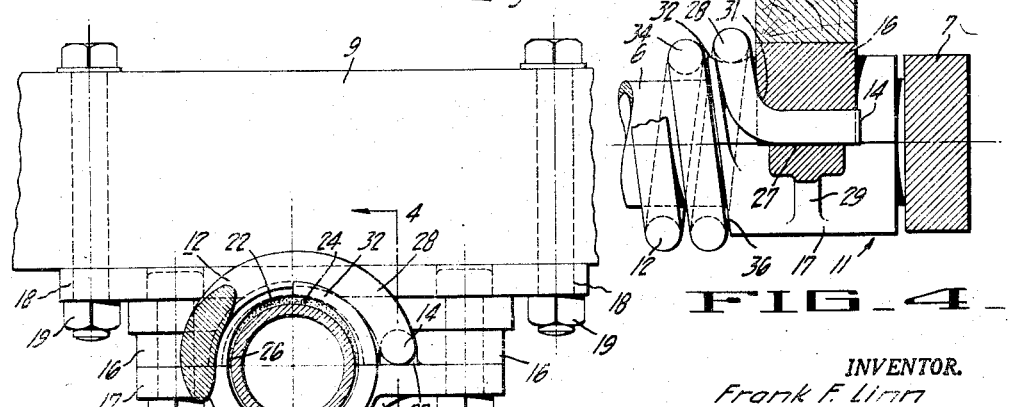
FIG_3_    FIG_4_
INVENTOR.
Frank F. Linn
BY
Manfred M. Warren
Atty Aug. 26, 1947.  F. F. LINN  2,426,513
WHEEL SUSPENSION FOR VEHICLES
Filed Feb. 25, 1947   2 Sheets-Sheet 2
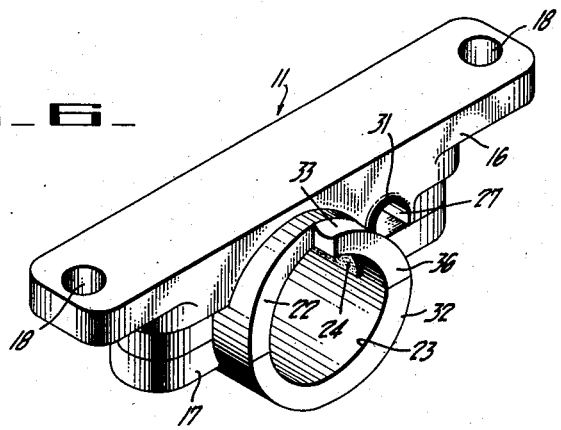
FIG_6_
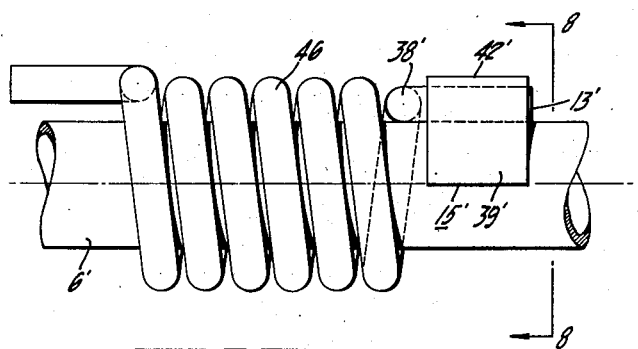
FIG_7_
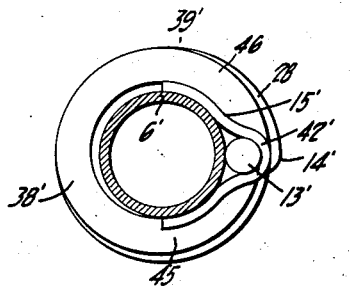
FIG_8_
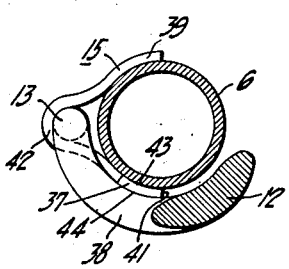
FIG_5_
INVENTOR.
Frank F. Linn
BY
his atty Patented Aug. 26, 1947

2,426,513

UNITED STATES PATENT OFFICE 2,426,513

WHEEL SUSPENSION FOR VEHICLES

Frank F. Linn, Oakland, Calif., assignor to Linn Company, a corporation of California Application February 25, 1947, Serial No. 730,663

15 Claims. (Cl. 267—58)

The invention relates to vehicle axles of the character disclosed in my copending application, Serial No. 618,250, filed in the U. S. Patent Office on September 24, 1945.

An object of the present invention is to provide in an axle of the character described an improved form of bearing and torsional spring support which with the associated axle parts imposes equal vertical movement of all portions of the vehicle body under static loading conditions to maintain a level load condition, and yet at the same time permits sufficient relative wheel displacement under dynamic conditions of use to retain the level load positioning of the body platform established during static conditions.

Another object of the present invention is to provide in an axle of the character described an improved form of bearing construction and torsional spring support functioning to positively hold the spring in spaced generally concentric relation around the axle shaft to prevent the torsionally flexing portions of the spring from rubbing, chafing, binding or wearing against the shaft.

A further object of the invention is to provide provide in an axle of the character described an improved form of means for connecting the spring to the shaft bearing and to the shaft.

Still another object of the invention is to provide a vehicle axle of the character above which is composed of a minimum number of ruggedly formed parts capable of withstanding the heavy static shock loads to which they are subjected over a substantially indefinitely long period of use, and which are so designed and constructed as to permit easy, convenient and precise assembly of the axle.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and descriptions may be adopted within the scope of the invention as set forth in the claims.

Figure 1 is a plan view of the trailer axle embodying the features of the present invention.

Figure 2 is a cross sectional view of a portion of the axle shown in Figure 1, and taken on the plane of line 2—2 thereon.

Figure 3 is a cross sectional view taken on the plane of line 3—3 of Figure 2.

Figure 4 is a cross sectional view taken on the plane of the line 4—4 of Figure 3.

Figure 5 is a cross sectional view taken on the plane of the line 5—5 of Figure 2.

Figure 6 is a perspective view.

Figure 7 is a side elevation view of a modified form of an axle from that shown in Figure 1.

Figure 8 is a cross-sectional view taken on the plane of line 8—8 of Figure 7.

The axle assembly embodying the present invention comprises, briefly, a unitary axle shaft having affixed at opposite ends thereto coplanar radially extending webs or crank throws bearing at their outer portions in parallel, spaced relation to said shaft wheel spindles upon which vehicle wheels of a suitable type are mounted for rotation. The shaft is mounted in suitable bearings fixed to a vehicle platform or chassis, and rotation inhibiting means is provided engaged between the movable shaft and the stationary vehicle platform or chassis to maintain the webs in a generally horizontal position relative to the surface over which the vehicle is to be operated. In the present embodiment, such rotation inhibiting means comprises helical springs disposed about the shaft and anchored at one end thereto. As in my copending application, above referred to, the opposite ends of the springs are secured to the bearings, in turn affixed to a stationary part of the vehicle so as to torsionally resist rotation of the shaft and corresponding vertical deflection of the wheels supported on the spindles eccentrically of the shaft. The present invention resides particularly in the form and construction of the bearings, the helical spring and anchorages therefor which properly position the spring around the axle shaft and in relation to its associated parts and positively maintain such position whereby the spring is at all times essentially free floating and capable of performing its torsional functioning without binding, rubbing or wearing against the shaft or the associated parts. With the assembly as set forth, and in a static or fixed condition, or under conditions of slow movement of a vehicle to which the assembly is attached, vertical movement of one wheel is transmitted directly by the unitary shaft to the other wheel maintaining a level load condition, a load placed upon the vehicle body adjacent one wheel causing a rotation of the shaft due to the eccentric positioning of the wheel spindle and a consequent lowering of the vehicle body, will effect a simultaneous and corresponding lowering of the vehicle body adjacent the other wheel due to the coincident rotation of both wheel spindles irrespective of the proximity of an unequally distributed load to either or both of the wheel mountings. Rotation of the axle shaft caused by such loading of the vehicle body is resisted by the torsional springs throughout the arc of movement of the wheel spindle. In this type of axle suspension the maximum available leverage for displacement of the spindles occurs when the spindle arms or webs are generally horizontally related to the ground and if these webs are displaced toward a vertical position the leverage for so displacing the arms greatly decreases. This reduction in leverage as the wheel spindles move away from the ground, coupled with the increased torsional resistance of the springs accompanying such movement effectively prevents under normal conditions of use a "bottoming" of the axle, that is, a condition wherein the axle is suspended vertically from the spindles.

Under conditions of dynamic use, where the vehicle to which the axle assembly is attached is operated at relatively high speed, a shock and displacement imparted to one wheel as by striking an obstruction or depression into a road drop does not change the level load condition of the vehicle platform because of the absorption of shock by the springs and shaft which dampen and retard the transmission of the displacement movement to the other wheel, and because of the relatively greater rate of recovery speed of the several displaced parts as compared to the slower rate of change of position of the loaded vehicle due to its inertia. Under static and dynamic condition of use, therefore, the axle assembly fulfills markedly different functions: in the first instance it acts as a simultaneous motion transmitting means; and in the second instance as a motion dampening and absorbing means, and as a normalizing agent for wheel spindle positioning.

Referring now to the drawings, the device embodying the features of the present invention comprises a shaft 6, preferably formed of mechanical tubing and having a desirably high elastic limit. Fixed to the shaft at opposite ends thereof are radially extending coplanar webs or throws 7, bearing at their free ends wheel spindles 8 in offset parallel relation with said shaft. Vehicle wheels 10 (shown in dotted line) including appropriate hubs and cone and bearing assemblies are rotatably secured to the spindles. The axle shaft is rotatably mounted on the vehicle chassis frame members 9 by means of bearings 11, as will be more fully hereinafter described. Disposed about the shaft adjacent the bearing are rotation resisting members, here shown in the form of helical springs 12 coiled about the shaft 6 with their inner ends 13 suitably affixed thereto as by means of members 15 welded or otherwise secured to the shaft. The bearings 11 are formed to receive and anchor the outer ends 14 of the springs 12.

With reference to the drawings, it must be noted that the fastening of the spring ends to the bearing and shaft and the form and construction of these parts is such as to position the webs or arms 7 in generally parallel relation to the ground when the axle is subjected to the normal unloaded weight of the vehicle. In other words, in the mounting of the axle to the vehicle the arms 7 will extend generally downward from the shaft 6 and will be rotated toward a horizontal position as the axle receives and supports the weight of the vehicle. Loading of the vehicle produces a further rotation of the arms to and past their horizontal position.

Preferably a pair of bearings 11 are used adjacent the opposite ends of shaft 6 and are formed for attachment to the vehicle frame. As here shown, each of the bearings is formed of two parts or sections, one section 16, which is the top section in use being provided with means of attachment to the vehicle frame and the bottom or cap section 17 functioning to complete the bearing journal. The upper section 16 may be secured either detachably or permanently to the frame members 9 and in the present construction the upper section is provided with bolt holes 18 adjacent its opposite ends for receipt of bolts 19 securing the upper bearing section to the vehicle frame members 9.

Cap 17 is preferably detachably secured to the base in aligned relation thereto by bolts 21. A shaft receiving bore is provided substantially one-half in the base and one-half in the cap, the line of cleavage of the cap and base coinciding approximately with the center line of shaft 6 engaged in said bore. The shaft bore is formed of semi-circular recesses, 22 in the base and 23 in the cap. Mounted in the top recess 22 and forming the bearing surface and supporting the weight on the shaft is a semi-cylindrical bearing member 24 which may be formed of any suitable wear resistent bearing material. I have found that a graphite impregnated fibrous plastic bearing material is quite suitable for this purpose. Edge shoulders 26 are provided adjacent the circumferential edges of recess 22 to retain the bearing half shell 24 against displacement longitudinal of the shaft, and preferably the shoulders are tapered from the line of cleavage between the base and cap towards the bottom of recess 22 where they terminate substantially short of the vertical axis of shaft 6. Should the bearing section 24 be worn through by the load imposed on the shaft, the shaft will not be scored as it would be if shoulders 26 were not so interrupted on the thrust side of the bearing, and the entire surface of recess 22 serves as a load bearing for the shaft upon removal or wear of the bearing shell 24.

Means are provided integral with the bearing for anchoring the outer ends 14 of springs 12, and such means desirably comprises a recess 27 formed in the base 16 of the bearing. The outer end 14 of the helical spring is bent axially of the plane of the adjoining spring convolution 28 to register with recess 27 and is held therein, and as shown in section in Figure 4, by the cleavage face of cap 17 when engaged against the face of the base. A reinforcing web 29 is preferably formed in the cap and extends from the outer side of shaft recess 23 to the portion of the cap overlying end 14 of the spring. A curved fillet 31 is provided at the edge of recess 27 and formed in base 16 for nesting and supporting the spring where the axially bent end 14 joins the helical coil 28.

With the end of the helical spring secured and anchored in the assembled bearing, and the opposite end of the spring 12 secured to the axle shaft, it will be apparent that rotation of the shaft is accompanied by a torsional stressing of the helical spring and flexure and distortion relative to the normal axis of the spring. Unless protected against such distortion causes an impingement of the spring with the shaft, and particularly a deflection of the first coil 28 adjacent the bearing to cause a binding of the spring on the shaft and rapid wear of the affected parts. This tendency to distort is partially combatted by the anchoring means for spring ends 13 and 14, the latter being in the form of axially bent portions and permitted in their respective securing means a limited movement longitudinal of the spring axis. A free compression of the spring and reduction in the overall length thereof is thus permitted, but in order to maintain the first coil adjacent the bearing against impingement with the shaft, and as an important part of the present invention, there is provided on the inner face of the bearing as an integral part thereof a spring coil support. As best shown in Figures 4 and 6, such coil support comprises an involute extension 32 formed partially in bearing base 16 and partially in cap 17. The involute 32 is formed with a concave top portion 33 which supports in close alignment therewith and in concentric spaced relation to the shaft coil 28 of spring 12. As will be best seen from Figures 3 and 4, the end spring turn 28 is enlarged diametrically over substantially the last 180 degrees of the turn adjacent the end 14 and is spiraled out sufficiently so as to overlie and engage with the exterior periphery of the involute extension 32. By reason of this arrangement the adjoining spring convolution 34 is in spaced juxtaposition to the end face 36 of the involute extension. While normally a clearance is maintained between the coil 34 and the face 36, it will be noted that on compression of the spring the configuration of the involute extension is such as to afford a full endwise engagement with the spring.

It will thus be clear that upon rotation of the shaft the extreme bending moment of the coil spring occurs adjacent one of the anchored ends thereof, and inasmuch as the inner end is anchored to the shaft and turns coincident therewith, the greater moment of deflexion is exerted adjacent spring end 14 anchored in the bearing. By supporting the spring coil and adjacent end 14 against inward displacement of the shaft and against coaxial displacement against the bearing, the possibility of interference between the spring and shaft is prevented. Desirably the opposite end 13 of the spring is likewise supported with respect to the shaft 6 so as to prevent a binding of the spring against the shaft during torsional flexure of the spring. With reference to Figure 5 it will be noted that the spring securing member 15 is so constructed as to support the spring end 13 in spaced relation to the periphery of shaft 6 and is provided with a longitudinal extension 37 which engages the inside face of the adjoining spring convolution 38 so as to support this convolution away from the shaft. With reference to said Figure 5 it will also be noted that the member 15 is formed as a substantially U-shaped clip having arcuately curved spaced ends 39 and 41 which engage the periphery of the shaft 6 and are permanently secured thereto by welding or the like. The closed end 42 of the member 15 defines a circular loop portion forming a socket for the spring end 13 which is bent longitudinally at substantially right angles to the plane of convolution 38. Extension 37 is formed on the clip end 41 and is desirably arcuate in form, see Figure 5, so that the inner concave face 43 thereof is supported directly upon the periphery of the shaft and outer convex face 44 thereof engages and supports the concave inner-periphery of the spring convolution 38.

A modified form of spring construction and spring-to-shaft anchoring means is shown in Figures 7 and 8 wherein the end spring convolution 38' is reduced in diameter at the spring end 13' so as to snugly fit and be rigidly supported upon the shaft periphery. Desirably such spring and shaft engagement is effected over approximately 90° of arc of coil and shaft engagement, thus providing an approximately 90° coil segment 45 in concentric engagement with the shaft periphery, and from which portion the coil spirals out in an adjoining approximately 90° segment 46 to the diameter of the remaining spring convolutions. The spring end 13' is preferably bent axially from the plane of convolution 38' as in the first described embodiment, but in the presently described form of the invention lies directly upon the periphery of the shaft and is secured thereto by a clip member 15'. This member is of generally U-shaped form similar to that of the first described embodiment and is secured to the shaft in a similar manner except that the closed end or portion 42' of the clip is so spaced from the periphery of the shaft 6' as to confine the spring end 13' directly against the periphery of the shaft. In this form of the invention the spring portion 45 lying against the shaft is substantially a dead end functioning through the spiral portion 46 to positively support the adjacent end of the spring in concentric relation to the shaft.

It will thus be clear that in both forms of the invention herein described the helical spring is securely supported at its ends to position the operating convolutions of the spring in spaced, concentric relation to the shaft, whereby all binding, wearing or rubbing of the spring against the shaft is effectively prevented during torsional deflexion of the spring coils. Thus the operation portion of the spring is fully free floating at all times with respect to the shaft.

I claim:

1. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring surrounding said shaft and having one end fixed thereto, means for anchoring the opposite spring end to said bearing means, and means on said bearing means extending into and engaging and supporting in spaced concentric relation to said shaft the adjacent convolution of said spring.

2. A wheel suspension for vehicles as characterized in claim 1 wherein said last named means comprises an involute extension on the end of said bearing means adjacent said spring which is formed with a circumferentially extending concavity for nesting and supporting at least a portion of said first spring convolution.

3. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring surrounding said shaft and having one end fixed thereto, means for anchoring the opposite spring end to said bearing means, said bearing means being formed with an involute extension on the end thereof adjacent said spring, said extension being formed to lie within and support away from said shaft a portion of the first spring convolution adjacent said second spring end, the pitch of said involute extension generally conforming to the pitch of the convolutions of said spring so as to position the end face of said extension in juxtaposition to the spring convolution adjacent the supported convolution.

4. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring surrounding said shaft and having one end fixed thereto, means for anchoring the opposite spring end to said bearing means, said bearing means being formed with a thread-shaped extension threaded internally into said spring adjacent said second named spring end so as to support said spring concentrically about said shaft at said bearing means.

5. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring mounted concentrically around said axle and spaced radially therefrom, the ends of said spring being formed to extend axially thereof at generally right angles to the adjacent spring convolution, means on said shaft for securing one of said spring ends thereto, said bearing means being formed with a socket for receiving the other end of said spring, and an involute extension on said bearing means spiraling longitudinally from said socket and extending into and supporting said spring convolution contiguous with said last named spring end.

6. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring mounted about said shaft and having an internal diameter somewhat greater than said shaft, an end convolution of said spring spiraling inwardly to the periphery of said shaft and engaging said periphery for a portion of the shaft circumference so as to support the adjacent spring convolutions concentric to and spaced from said shaft and having the contiguous spring end secured to said shaft, the opposite end of said spring being secured to said bearing means, and means on said bearing means extending into and engaging and supporting in spaced concentric relation to said shaft the adjacent convolution of said spring.

7. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring mounted about said shaft and having an internal diameter somewhat greater than said shaft, an end convolution of said spring spiraling inwardly to the periphery of said shaft and engaging said periphery for a portion of the shaft circumference so as to support the adjacent spring convolutions concentric to and spaced from said shaft, the end of said spring convolution being formed to extend axially from said convolution at substantially right angles to the plane thereof, means securing said spring end to said shaft, the opposite end of said spring being formed to extend axially from the adjacent end convolution at substantially right angles to the plane thereof, said bearing means being formed with a socket for receiving and holding against relative rotation said last named spring end, and means on said bearing means extending from adjacent said socket to extend into and engage and support concentrically of said shaft the last mentioned spring convolution.

8. A wheel suspension for vehicles comprising, an axle shaft having a wheel supporting means integrally fixed thereto at one end thereof for mounting a wheel for rotation about an axis spaced transversely from the axis of the shaft, bearing means designed for vehicle attachment mounted on said axle shaft adjacent one end thereof for supporting the vehicle on said shaft and permitting rotation of the shaft therein, a helical spring surrounding said shaft interiorly of said bearing means with one end of said spring adjacent said bearing means, said bearing means being provided with means securing said spring end thereto, the opposite end of said spring being secured to said shaft, and said bearing means having an end portion fitting within and supporting away from said shaft the first spring convolution adjacent said first spring end.

9. A wheel suspension for vehicles comprising, an axle shaft having transversely offset wheel supporting means at one end thereof, bearing means for said shaft including a section formed for attachment to a vehicle frame or the like and having a substantially semi-cylindrical bearing portion fitting upon said shaft for supporting said frame or the like thereon, a second bearing section having a substantially semi-cylindrical bearing portion mounted on said shaft in complementary relation to said first bearing portion and being secured in such relation to said first section, a helical spring mounted concentrically about said shaft and having one end secured thereto, said first bearing section having an axially extending recess formed in the face thereof abutting said second section and opening to an end adjacent said spring, the other end of said spring being extended axially from the plane of the contiguous spring convolution to fit within said recess, said first section end being formed with an involute extension fitting within and supporting said spring convolution in spaced concentric relation to said shaft.

10. A wheel suspension for vehicles comprising, an axle shaft having transversely offset wheel supporting means at one end thereof, bearing means for said shaft including a section formed for attachment to a vehicle frame or the like and having a substantially semi-cylindrical bearing portion fitting upon said shaft for supporting said frame or the like thereon, a second bearing section having a substantially semi-cylindrical bearing portion mounted on said shaft in complementary relation to said first bearing portion and being secured in such relation to said first section, a helical spring mounted concentrically about said shaft and having one end secured thereto, said bearing sections cooperating to define a recess opening to the end face of said sections opposed to said spring, the other end of said spring being formed to extend axially at substantially right angles to the plane of the contiguous spring convolution and being inserted in said recess, said end face having an involute configuration to engage within and support said spring convolution and to lie in juxtaposition to the adjacent spring convolution to support said spring concentrically about said shaft and to serve as an endwise abutment for said spring.

11. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring mounted concentrically around said axle and spaced radially therefrom, the ends of said spring being formed to extend axially thereof at generally right angles to the adjacent spring convolution, means mounted on said shaft for engaging and holding one end of said spring and having a portion thereof engaging the adjacent spring convolution to support the spring in spaced relation from the shaft, said bearing means being formed with a socket for receiving the other end of said spring, and an involute extension on said bearing means spiraling longitudinally from said socket and extending into and supporting said spring convolution contiguous with said last named spring end.

12. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring mounted concentrically around said axle and spaced radially therefrom, the ends of said spring being formed to extend axially thereof at generally right angles to the adjacent spring convolution, means on said shaft for securing one of said spring ends thereto including a U-shaped clip member having its free ends fixed to the periphery of the shaft with the axis of the closed end of the member parallel to the axis of the shaft and spaced from the shaft periphery, said closed end formed to enclose one end of said spring, said member having a longitudinally offset portion having a convexly curved periphery fitting within the spring convolution adjacent said end to support the former in spaced relation to said shaft, said bearing means being formed with a socket for receiving the other end of said spring, and an involute extension on said bearing means spiraling longitudinally from said socket and extending into and supporting said spring convolution contiguous with said last named spring end.

13. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring surrounding said shaft and having one end fixed thereto, the first convolution of said spring being circumferentially enlarged adjacent said bearing means, means for anchoring the spring end adjacent said enlarged convolution to said bearing means, and means on said bearing means positioned to lie within and to support away from said shaft said first convolution and to space longitudinally thereof said next convolution.

14. A vehicle axle as characterized in claim 13 wherein said last named means comprises an involute extension on the end of said bearing means adjacent said spring which is formed with a circumferentially extending concavity for nesting and supporting at least a portion of said first spring convolution.

15. A wheel suspension for vehicles comprising, bearing means designed for vehicle attachment, an axle shaft journalled for rotation in said bearing means and having provision at one end thereof for attachment of a vehicle wheel on an axis of support spaced transversely from the axis of said shaft, a helical spring surrounding said shaft and having one end fixed thereto and having the first convolution at the opposite end of said spring to said end diametrically enlarged, means for anchoring the opposite spring end to said bearing means, said bearing means being formed with an involute extension on the end thereof adjacent said spring, said extension being formed to lie within and support away from said shaft a portion of the first spring convolution adjacent said second spring end, the pitch of said involute extension generally conforming to the pitch of the convolutions of said spring so as to position the end face of said extension in juxtaposition to the spring convolution adjacent the supported convolution.

FRANK F. LINN.

REFERENCES CITED

The following references are of record in the file of this patent:

UNITED STATES PATENTS

| Number | Name | Date |
|---|---|---|
| 1,889,559 | Masury | Nov. 29, 1932 |
| 1,209,917 | Westinghouse | Dec. 26, 1916 |
| 2,035,554 | Krejmas | Mar. 31, 1936 |
| 41,404 | Taber | Jan. 26, 1864 |
| 444,526 | Norwood et al. | Jan. 13, 1891 |
| 2,000,905 | Rockefeller | May 14, 1935 |
| 2,023,254 | Stimson | Dec. 3, 1935 |
| 2,068,676 | Hickman | Jan. 26, 1937 |
| 2,073,267 | Prouty | Mar. 9, 1937 |
| 2,227,762 | Ronning | Jan. 7, 1941 |
| 1,866,762 | Field | July 12, 1932 |
| 2,321,832 | Leighton | June 15, 1943 |
| 2,153,237 | Clark | Apr. 4, 1939 |

FOREIGN PATENTS

| Number | Country | Date |
|---|---|---|
| 342,649 | France | July 13, 1904 |
| 812,732 | France | Feb. 8, 1937 |